United States Patent
Matsumoto et al.

(10) Patent No.: US 6,343,333 B1
(45) Date of Patent: Jan. 29, 2002

(54) SERVICE EXECUTIVE APPARATUS HAVING SERVICES AND CORRESPONDING SCRIPTS REGISTERED IN SERVICE AND CONDITION TABLES

(75) Inventors: Yasuhide Matsumoto; Masahiko Murakami; Sumiyo Okada; Tatsuro Matsumoto; Hidenobu Ito; Hitoshi Yamauchi; Kenichi Sasaki, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/159,595

(22) Filed: Sep. 24, 1998

(30) Foreign Application Priority Data

Dec. 19, 1997 (JP) .............................. 9-351458

(51) Int. Cl.[7] .............................................. G06F 9/00
(52) U.S. Cl. ...................................... 709/320; 709/317
(58) Field of Search ............................... 707/513, 516, 707/103, 4; 717/5; 345/329; 709/218, 204, 202, 205, 320, 317

(56) References Cited

U.S. PATENT DOCUMENTS

| 5,566,330 | A | * | 10/1996 | Sheffield | 707/4 |
| 5,933,599 | A | * | 8/1999 | Nolan | 345/329 |
| 5,950,006 | A | * | 9/1999 | Crater et al. | 717/5 |
| 5,995,972 | A | * | 11/1999 | Allgeier | 707/103 |
| 6,021,418 | A | * | 2/2000 | Brandt et al. | 707/516 |
| 6,061,699 | A | * | 5/2000 | DiCecco et al. | 707/513 |
| 6,101,478 | A | * | 8/2000 | Brown | 705/2 |
| 6,125,387 | A | * | 9/2000 | Simonoff et al. | 709/218 |

FOREIGN PATENT DOCUMENTS

JP          10-190729          7/1998

* cited by examiner

Primary Examiner—Le Hien Luu
(74) Attorney, Agent, or Firm—Staas & Halsey LLP

(57) ABSTRACT

In the case where specification of service to be used is received, the specified service is retrieved from a service table, in which services and script files storing a scripts combined in the services are stored with them corresponding with each other, a script file is specified, and use of the specified script file is executed so that use of the service is executed. The use of the script file is specifically transmission, addition or deletion of the script file.

12 Claims, 13 Drawing Sheets

FIG. 4

```
/Service  Notice Of Whereabouts          ← SERVICE
{                                          NAME
/Function
{
    /presence                            ← PRESENCE
    {                                      SET SCRIPT
        %autoreply=0
    }
    /absence                             ← ABSENCE
    {                                      SET SCRIPT
        /set %status "absent a while"
        %autoreply=1
        %settime=$time
    }
    /meeting                             ← MEETING
    {                                      SET SCRIPT
        /set %status "meeting"
        %autoreply=1                       AUTO
        %settime=$time                     RESPONSE
    }                                      SCRIPT
                                            ↓
    /autoreply
    {
        /if(%autoreply!=1)    /return
        %result=$ismatch("$msg","mynickname")
        /if(%result!=1)       /return
        /privmsg $nick"absent for a moment
        %status(AR)"
        /privmsg $nick" ! destination set time
        %settime(AR)"
    }
}
/Event
{
    OnPrivmsg(#channel,*,*)              ← EVENT
    {                                      PROCESS
        /autoreply                         SCRIPT
    }
}
}
```

FIG. 6

| NOTICE MESSAGE | CONDITION SETTING UNIT | | | | EXECUTIVE SCRIPT |
|---|---|---|---|---|---|
| | KEYWORD | ... | SPEAKER | ... | |
| PRIVMSG | –(NO SET) | ... | — | ... | /Notice Of Whereabouts. autoreply |
| JOIN | — | ... | 3-RD SECTION | ... | /ServiceB.Script2 |
| TOPIC | "MEETING" | ... | — | ... | /ServiceC.Script3 |
| ... | ... | ... | ... | ... | ... |

| SCRIPT NAME | SERVICE NAME | SCRIPT DEFINITION MAIN FRAME |
|---|---|---|
| autoreply | Notice of Whereabouts | /autoreply<br>{<br>  /if(%autoreply!=1)  /return<br>  %result=$ismatch("$msg","mynickname")<br>  /if(%result!=1)  /return<br>  /privmsg $nick"absent for a moment<br>  %status(AR)"<br>  /privmsg $nick" ↑ destination set time<br>  %settime(AR)"<br>} |
| Script2 | ServiceB | ... |
| Script3 | ServiceC | ... |
| ... | ... | ... |

| SERVICE NAME | FILE NAME |
|---|---|
| Notice Of Whereabouts | Script File A |
|  | Script File B |
|  | Script File C |
| ServiceB | ... |
| ServiceC | ... |
| ⋮ | ⋮ |

~234

SERVICE EXECUTIVE APPARATUS HAVING SERVICES AND CORRESPONDING SCRIPTS REGISTERED IN SERVICE AND CONDITION TABLES

BACKGROUND OF THE INVENTION

The present invention relates to a service executive method, a service executive apparatus, a computer memory product and a client of a chat system for controlling processes by means of scripts representing a processing sequence.

A script processing system, which controls execution based on texts called as scripts in which a processing sequence of application program is described, is generally incorporated into OS (Operating system). A script is created by combining a command for commanding execution of an application program and a system command which is previously prepared in OS.

When a user creates a script which successively executes a plurality of application programs and commands OS to execute the script, for example, the application programs described in the script are executed in order of the description. Moreover, in this script processing system, condition branches, variable numbers, etc. can be used, and complicated execution control can be made by using them. Namely, the user describes a script based on a desired processing sequence so as to be able to control execution of application programs.

There exists an example in which such a script processing system is incorporated into an application program so as to be used for controlling execution of the application program. This application program is provided with plural modules such as an executive module whose function is simple and which is suitable for general use, and an executive module for executing a predetermined command (function) according to an event by pressing down a predetermined button switch. When a user describes a script by combining these modules and registers the script in the application program so as to be able to control execution of the application program.

After the script created by the user is registered in the application program, the script is treated as an execution module which can be utilized by another script. Namely, in the application program into which the script processing system is incorporated, the function of the application program can be extended by adding a script thereinto.

As mentioned above, in the conventional application program into which the script processing system which is effective in extending the function is incorporated, there arises a problem such that convenience of distribution of the created script is not considered.

Generally, a script is treated in unit of a script file which stores the script, but in a multi-functional script which is composed by combining scripts respectively defined in a plurality of script files, it is necessary to treat the respective script files collectively.

In a chat system arranged by connecting a plurality of clients, for example, it is assumed that when users who operate respective clients make conversation, they talk about a script which has multifunction and is convenient. In the case where one user owns the script and the other user does not own it, when the script is transmitted from the former to the latter, all the script files to be transmitted should be designated by the user of the client on the transmission side, so an improvement in reducing the operation required for the transmission has been desired.

BRIEF SUMMARY OF THE INVENTION

It is a main object of the present invention to provide a service executive method, a service executive apparatus, a computer memory product and a client of a chat system using them in which the operation required for specifying a script file in distribution of a script is reduced.

From a first aspect of the present invention, when specification of service to be used is received, the specified service is retrieved from a service table in which services and script files storing scripts combined in the services with them corresponding with each other so that a script file is specified, and use of the script file is executed so that use of the service is executed.

As mentioned above, in the first aspect, when specification of service to be used is received, all the script files storing scripts combined in the service are specified from the service table, so when a user supplies a service, a burden to the user performing an operation for specifying script files relating to the service is reduced.

From a second aspect of the present invention, the use of the script file in the first aspect is transmission, addition or deletion of the script file. In the second aspect, when specification of service to be transmitted, added or deleted is received, all the script files storing scripts combined in the service are specified from the service table. Therefore, when a user transmits, adds or deletes service, a burden to the user performing an operation for specifying script files relating to the service is reduced.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanatory drawing showing a concrete example of a script according to the present invention;

FIG. 6 is an explanatory drawing for explaining a concrete example of a condition table according to the present invention;

FIG. 7 is an explanatory drawing for explaining a concrete example of a script table according to the present invention;

FIG. 8 is an explanatory drawing for explaining a concrete example of a service table according to the present invention;

DETAILED DESCRIPTION OF THE INVENTION

The following will describe in detail the present invention on reference to the drawings showing embodiment.

Figure 1:
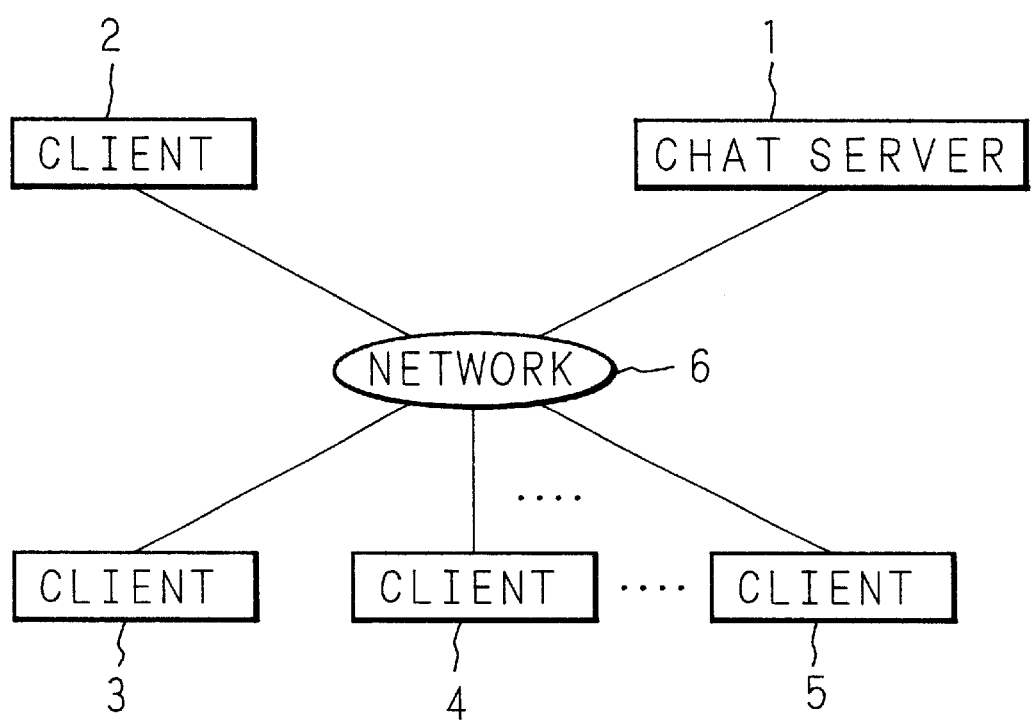
FIG. 1 is a block diagram showing an arrangement of a chat system according to the present invention.

FIG. 1 is a block diagram showing an arrangement of a chat system according to the present invention. A chat server 1 as a host computer is connected with a plurality of clients (for example, personal computers) 2 through 5 according to the present invention via a network 6 of a public line. When receiving a message from the clients 2 through 5, the chat server 1 transmits the message to other clients 2 through 5 immediately. This arrangement realizes conversation using characters between users who operate their clients. Since the chat system displays stated contents and corresponding names of people who made the statements on the clients 2 through 5, even if a plurality of users make statements simultaneously, mismatch between the stated contents and the people who made the statement does not occur on a receiving side.

Figure 2:
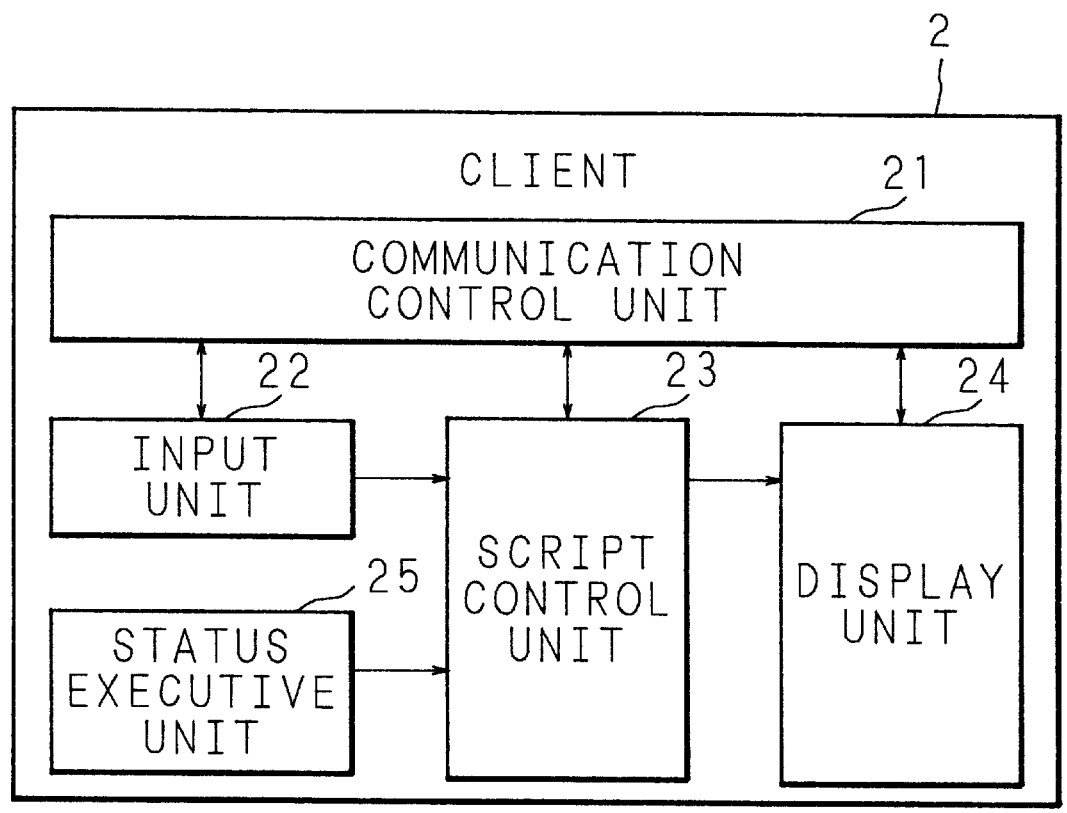
FIG. 2 is a block diagram showing an arrangement of a service executive apparatus according to the present invention.

FIG. 2 is a block diagram showing an arrangement of a service executive apparatus (client) according to the present invention. A commuunication control unit 21 for controlling a communication process with the chat server 1 via the network 6 is illustrated. The communication control unit 21 is connected to an input unit 22 for generating all event according to an operation through a keyboard, a mouse, etc. A script control unit 23 is connected to the input unit 22 for controlling execution of an executive module based on a script. A display unit 24 is provide for displaying on a screen a signal transmitted/received to/from the script control unit 23.

The script control unit 23 is connected with the input unit 22 and a status executive unit 25 for generating various events according to a change in an operating status of OS such as minimization of a window of the display screen, and the script control unit 23 receives the events given respectively therefrom as client events. Moreover, the script control unit 23 receives a server event given from the communication control unit 21. Furthermore, the script control unit 23 is connected with the display unit 24 so as to control information relating to the display on the screen.

Figure 3:
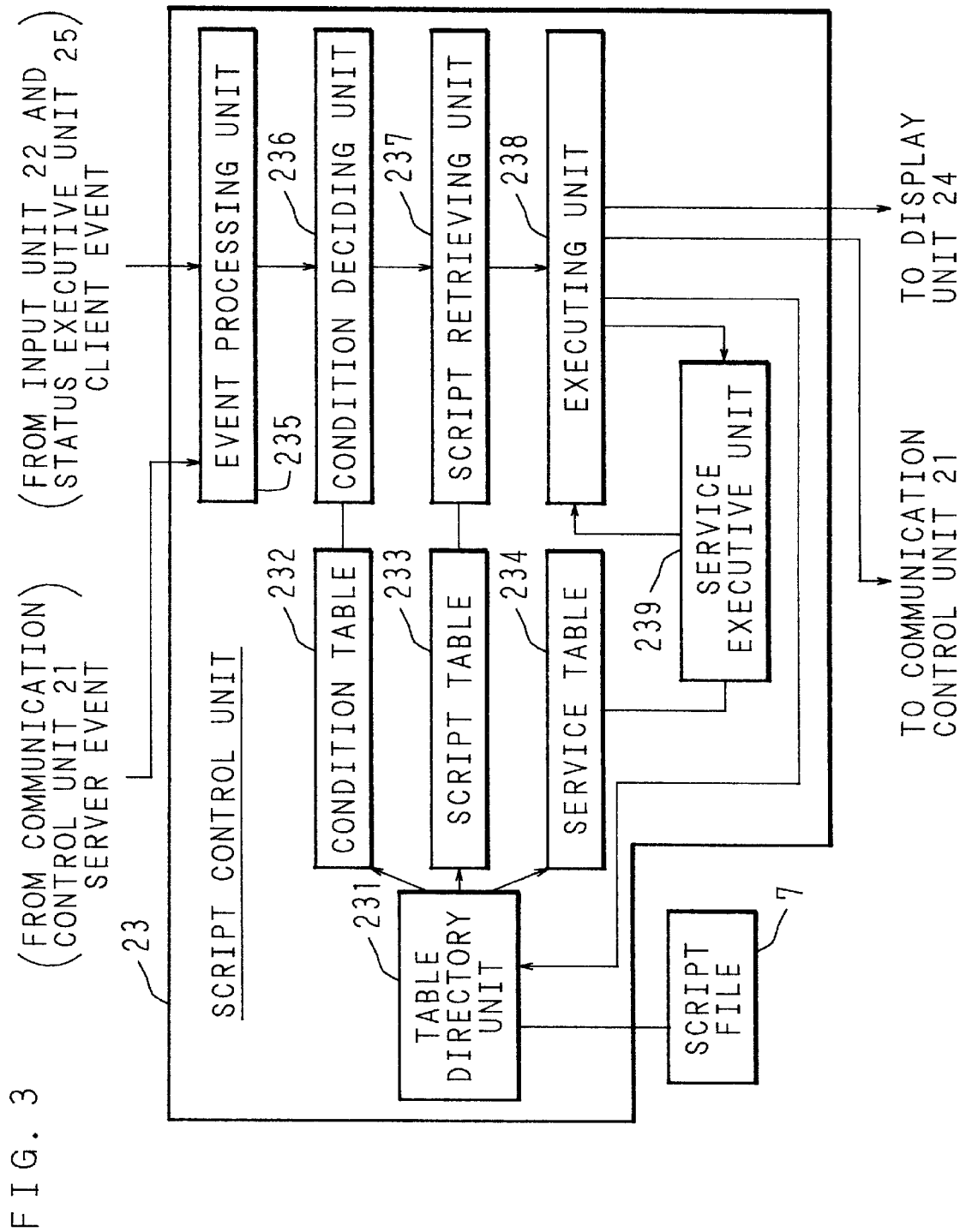
FIG. 3 is a block diagram showing an arrangement of a script control unit according to the present invention.

FIG. 3 is a block diagram showing an arrangement of the script control unit 23 according to the present invention. Service in the following description means a script composed by combining a plurality of scripts. In the drawing, 231 is a table directory unit. The table directory unit 231 refers to a script file 7 and registers types and contents of events and names of scripts to be executed into a condition table 232 with them corresponding with each other. Moreover, the table directory unit 231 registers the names of the scripts, names of services to which the scripts belong, and a script definition mainframe where the contents of the scripts are described into a script table 233 with them corresponding with each other. Moreover, the table directory unit 231 registers the names of the services and all the names of the script files, where definition of the scripts combined in the services are stored, into a service table 234 with them being made to correspond with each other. The registration of the aforementioned information in the respective tables is executed by registering the service (or script) in an application program.

Meanwhile, an event processing unit 235 receives server events or client events from the communication control unit 21, the input unit 22 and the status executive unit 25, and discriminates their types and contents so as to supply the discriminated results to a condition deciding unit 236. The condition deciding unit 236 refers to the condition table 232 so as to specify a name of the script corresponding to the given discriminated results, and supplies the name of the script to a script retrieving unit 237. The script retrieving unit 237 refers to the script table 233 so as to call a script definition main frame of the given name of the script, and supplies it to an executing unit 238. The executing unit 238 executes the given script or system command by means of publicly known executing means. The executed result reflects on the communication control unit 21, the display unit 24 or the other executive modules such as the table directory unit 231.

Moreover, in the case where the executing unit 238 receives specification of service, it supplies the name of the service to a service executive unit 239. The service executive unit 239 retrieves the given service name from the service table 234, and specifies the name of the script file where the scripts combined with the service are stored so as to supply the name of the specified script file to the executing unit 238. The executing unit 238 executes use of the specified script file, more specifically, transmission, addition or deletion of the script file by means of publicly known file access means.

FIG. 4 is an explanatory drawing for explaining a script used in the script control unit 23 according to the present invention, more specifically, a notice of whereabouts service which makes a client automatically respond to whereabouts of a user corresponding to a nickname according to call of the nickname in a statement of a chat. In a format of the script, it is defined that name of service is described between "/Service" and "{" (in FIG. 4, "Notice of Whereabouts"). Moreover, a character array beginning with % represents an internal variable name defined by a user, a character array beginning with $ represents a reserved variable name reserved by the script processing system, and a character string beginning with/represents a command name (or script name). Furthermore, it is defined that definitions of individual scripts are described between "{" and "}" behind "/Function".

In FIG. 4, a presence set script sets an internal variable number, autoreply, to 0. An absence set script sets a character array, "absent a while" in an internal variable number, status. Moreover, 1 is set in the internal variable number, autoreply. Further, a current time (a value of a reserved variable number, time) is set in an internal variable number, settime, representing a time. A meeting set script sets a character array, "meeting" in the internal variable number, status. Moreover, 1 is set in the value of the internal variable number, autoreply. Further, a current time is set in the internal variable number, settime.

An auto response script judges as to whether or not the value of the internal variable number, autoreply, is 1, and when it judges that the value is not 1, it terminates the process. When the value of the internal variable number, autoreply, is not 1, a decision is made as to whether or not a nickname of a user (mynickname) operating the service executive apparatus (client) is included in a statement content of a certain speaker (reserved variable number, msg), and the judged result is stored into an internal variable number, result. When the judged result (the value of the internal variable number, result) is "not included" (not 1), the process is terminated. When the judged result is "included", the values of the internal variable numbers are referred to, and a predetermined message is transmitted to a channel (reserved variable number, nick) in which the speaker participates.

In the case where, for example, in the client executing the aforementioned notice of whereabouts service, the character array, "meeting", is set in the internal variable number, status, and 11:20 is set in the internal variable number, settime, when a nickname of the user of that client is called, messages "absent for a moment", "meeting" and "destination set time 11:20" are displayed on a display unit of the client of the user who made the call.

An event process script represents correspondence between events and scripts to be executed. For example, script, OnPrivmsg (#channel,*,*) represents that when an event is generated by making any statement in a channel specified in #channel, a predetermined command (autoreply) is executed.

When the registration of the aforementioned services (scripts) in the application program is received, the aforementioned syntaxes are analyzed so as to be stored in the condition table 232, the script table 233 and the service table 234 with them corresponding to predetermined information.

Figure 5:
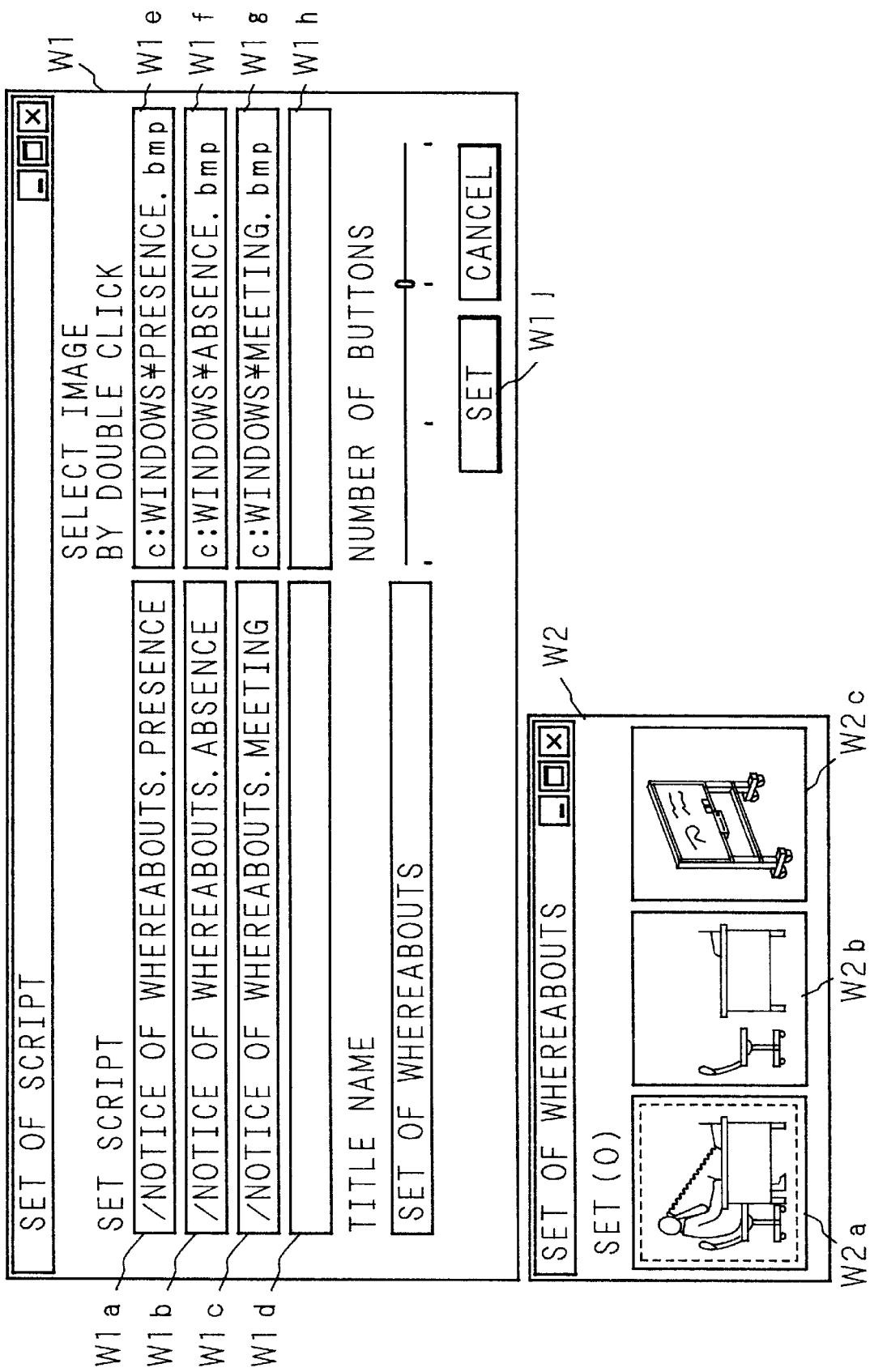
FIG. 5 is an explanatory drawing for explaining a display screen of a script execution command application program which commands execution of the script.

FIG. 5 is an explanatory drawing for explaining a display screen of a script execution command application program which commands to execute the aforementioned notice of whereabouts service. In FIG. 5, W1 is a script set window. Areas W1a, W1b, W1c and W1d arranged on the left part of the script set window W1 in up-to-down direction are script fields which receive inputs of the scripts, and the present set script of the notice of whereabouts service shown in FIG. 4 is set in the script field W1a. Moreover, the absence set script and the meeting set script of the notice of whereabouts service are set respectively in the script fields W1b and W1c.

Further, areas W1e, W1f, W1g and W1h arranged on the right part of the script set window W1 in the up-to-down direction are image fields which receive inputs of the image file names to be displayed, and an image file "presence.bmp" is specified in the image field W1e. Moreover, absence.bmp and meeting.bmp are specified respectively in the image fields W1f and W1g. Further, an area W1i below on the lower part of the script set window W1 is a title field which receives input of the titles. Furthermore, W1j is a setting button for setting (registering) the contents inputted into the respective input fields in the application program.

Meanwhile, W2 is a whereabouts set window composed based on the input information received in the respective input fields of the script set window W1. The whereabouts set window W2 is provided with a presence set button W2a, an absence set button W2b and a meeting set button W2c from left. Images displayed on the respective buttons are set in the image fields W1e, W1f and W1g. Moreover, the presence set button W2a, the absence set button W2b and the meeting set button W2c command execution of the scripts whose inputs are received in the script fields W1e, W1f and W1g.

For example, in the case where a user presses down the absence set button W2b by using a mouse or the like on the whereabouts set window W2, a character array "absent for a moment" is set in the internal variable number, status, by executing the aforementioned absence set script. Moreover, 1 is set in the internal variable number, autoreply. Moreover, a current time (a value of the reserved variable number, time) is set in the internal variable number, settime, representing a time.

When such a script execution command application program is used, the whereabouts information to be notified can be set easily by the aforementioned notice of whereabouts service.

FIG. 6 is an explanatory drawing for explaining a concrete example of the condition table 232 according to the present invention. In FIG. 6, a notice message field on which types of events are displayed, a condition setting unit field on which conditions are displayed and an executive script field on which names of scripts to be executed are displayed are provided from left. In the notice message field, "PRIVMSG" represents an event by a statement of a user. Moreover, "JOIN" represents an event by participation of a new user in the channel. Furthermore, "TOPIC" represents an event whose topic is set in the channel. For example, when the "PRIVMSG" event is received, the autoreply script of the notice of whereabouts service is executed without any conditions.

Conditions relating to the contents of events such as keywords and speakers are set in the condition setting unit field. For example, in the case where "meeting" is set as a keyword of the TOPIC event, when a word "meeting" is included in the topic set in the channel, a predetermined script is executed.

FIG. 7 is an explanatory drawing for explaining a concrete example of the script table 233 according to the present invention. In FIG. 7, a script name field on which script names are displayed, a service name field on which service names are displayed and a script definition main frame field are provided from left. For example, the autoreply script is combined in the notice of whereabouts service.

FIG. 8 is an explanatory drawing for explaining a concrete example of the service table 234 according to the present invention. In FIG. 8, a service name field and a file name field are provided from left. For example, a plurality of scripts combined in the notice of whereabouts service are distributed in scripts files A, B and C so as to be defined, respectively.

Figure 9:
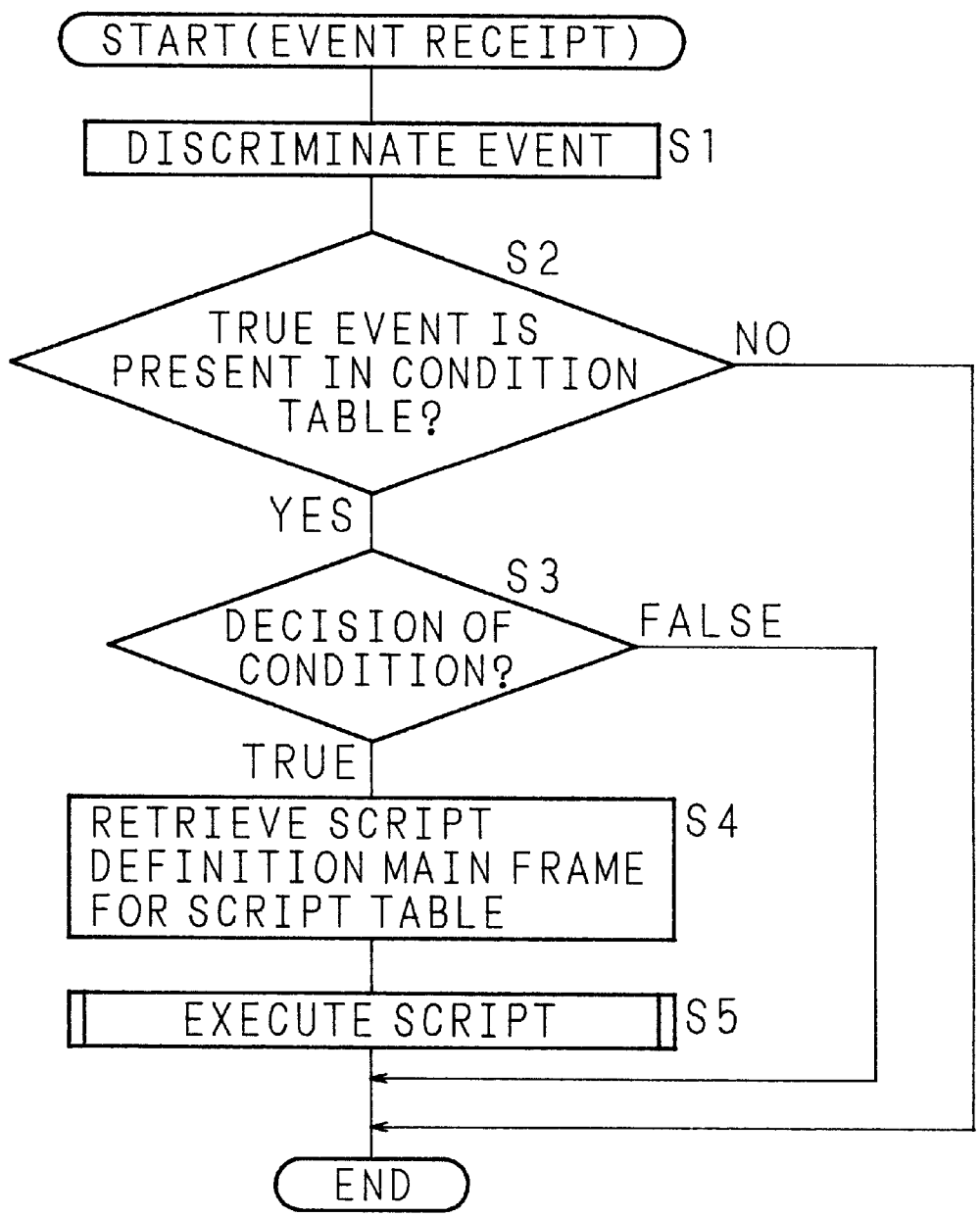
FIG. 9 is a flow chart showing a processing sequence in the script control unit according to the present invention.

FIG. 9 is a flow chart showing the processing sequence in the script control unit 23 according to the present invention. In the case where an event is received from the communication control unit 21, the input unit 22 or the status executive unit 25, the event processing unit 235 discriminates a type and a content of the event (S1). A decision is made in the condition deciding unit 236 as to whether or not the type of the discriminated event exists in the condition table 232 (S2). When the type of the event exists, a decision is made as to whether or not the content coincides with the set condition (TRUE) (S3), and when TRUE, the condition deciding unit 236 supplies the name of the script to be executed to the script retrieving unit 237. The script retrieving unit 237 retrieves a definition main frame of the script from the script table 233 so as to supply it to the executing unit 238 (S4). The executing unit 238 executes the given script according to the processing sequence, mentioned later (S5). When the type of the discriminated event does not exist in the condition table 232 at S2, and the content of the event does not coincide with the set condition at S3, the process is terminated.

Figure 10:
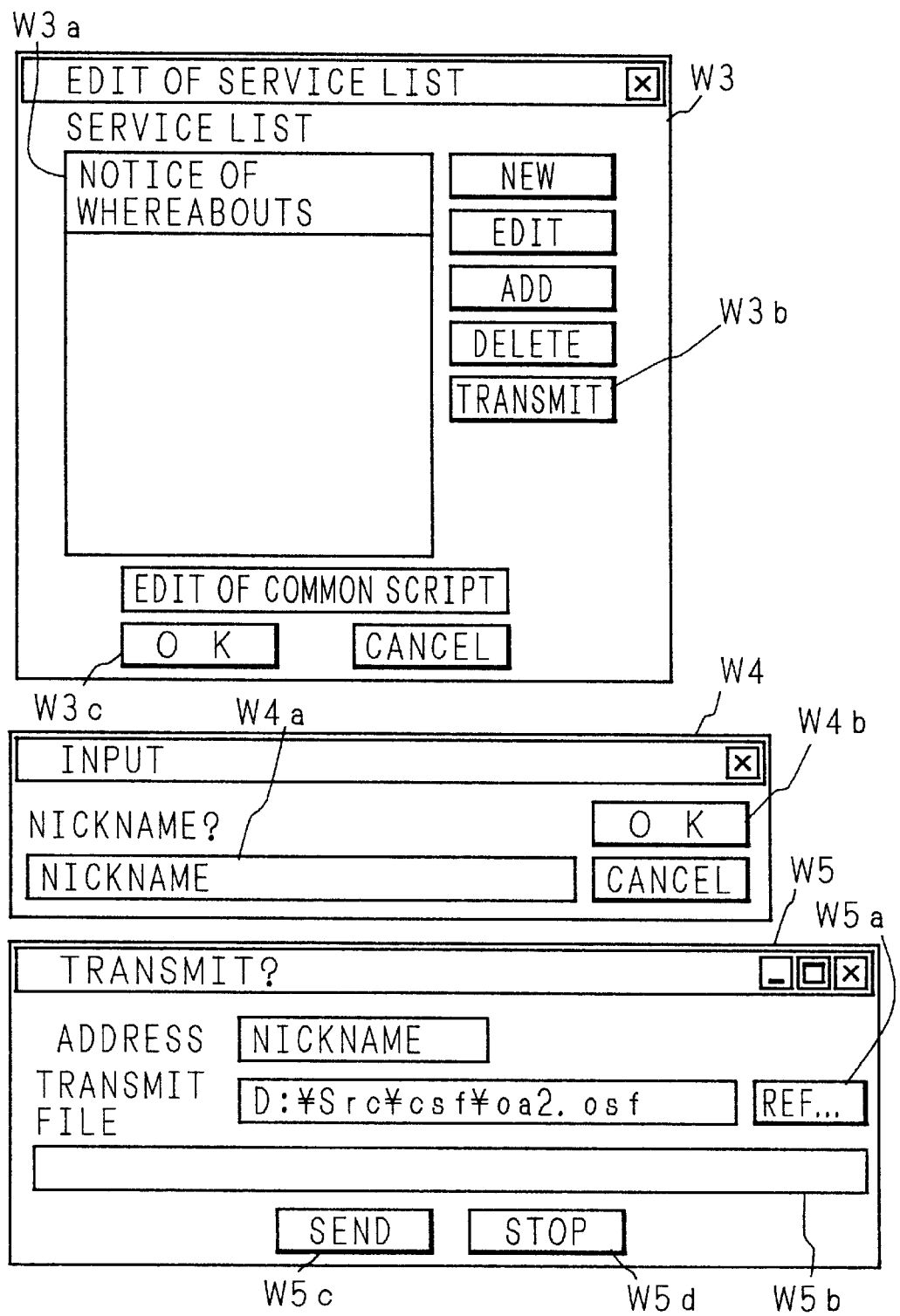
FIG. 10 is an explanatory drawing for explaining a display screen according to the present invention.

FIG. 10 is an explanatory drawing for explaining a display screen according to the present invention. In FIG. 10, W3 is a service list edit window. An area W3a provided in the center of the service list edit window W3 is a service select field on which the services registered in the application program are displayed in the form of a list and selection of the services is received. A transmission button W3b provided to the right portion of the service list edit window W3 is a button which sets transmission as an action for the selected service, and after a user presses down this button by means of a mouse or the like, the user presses down an OK button W3c provided to the lower portion of the service list edit window W3 so that the set action, namely, transmission of the service is executed.

W4 is a destination set window which receives set of a destination. An area provided in the central portion of the destination set window W4 is a nickname input field W4a which receives inputs of nicknames. "Nickname" is inputted into the nickname input field W4a. After a nickname is inputted into the nickname input field W4a, an OK button W4b provided to the right portion of the destination set window W4 is pressed down so that a display screen which receives a transmission command is displayed.

W5 is a transmission command window which receives a transmission command. A button W5a provided to the central right portion of the transmission command window W5 is a reference button for confirming script files to be transmitted. An area W5b provided to the central lower portion of the transmission command window W5 is a progress display meter on which a progress status of the transmission of files is displayed by a length of a bar. Moreover, a button W5c provided to the lower portion of the transmission command window W5 is a transmission button which commands the transmission. When a user presses down the transmission button W5c, the transmission of the selected service is started.

Figure 11:
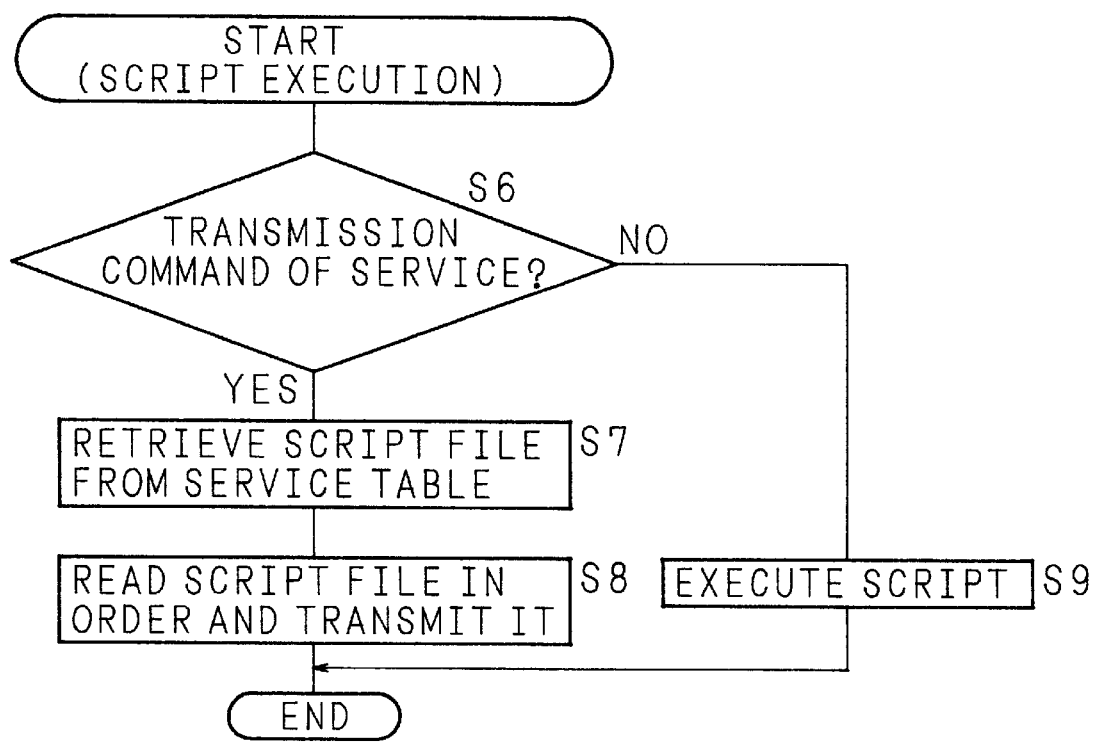
FIG. 11 is a flow chart showing a processing sequence for executing the script according to the present invention.

FIG. 11 is a flow chart showing a processing sequence of the script execution (S5 in FIG. 9) according to the present invention. A decision is made as to whether or not a command (or script) to be executed is the transmission command of the service (script file) given on the service list edit window shown in FIG. 10 (S6). When the command is the transmission command, name of the service to be transmitted is retrieved from the service table 234, and script files storing the definition main frame of scripts combined in the services are specified (S7). The specified script files are successively read so as to be transmitted to the communication control unit 21 (S8). When the command is not the transmission command at S6, the script (command) is executed by publicly known script executing means (S9).

Therefore, at the time of transmission of the service, a user of the apparatus executing the processing sequence is released from the operating burden for specifying all the script files combined in the service.

In the case of addition or deletion of service, a decision is made as to whether or not a command is an addition command or a deletion command, and script files combined in the service to be processed are specified based on the same processing sequence at S7 so that the processes are executed. As a result, the operating burden of a user for specifying script files is reduced by executing the respective processes.

Figure 12:
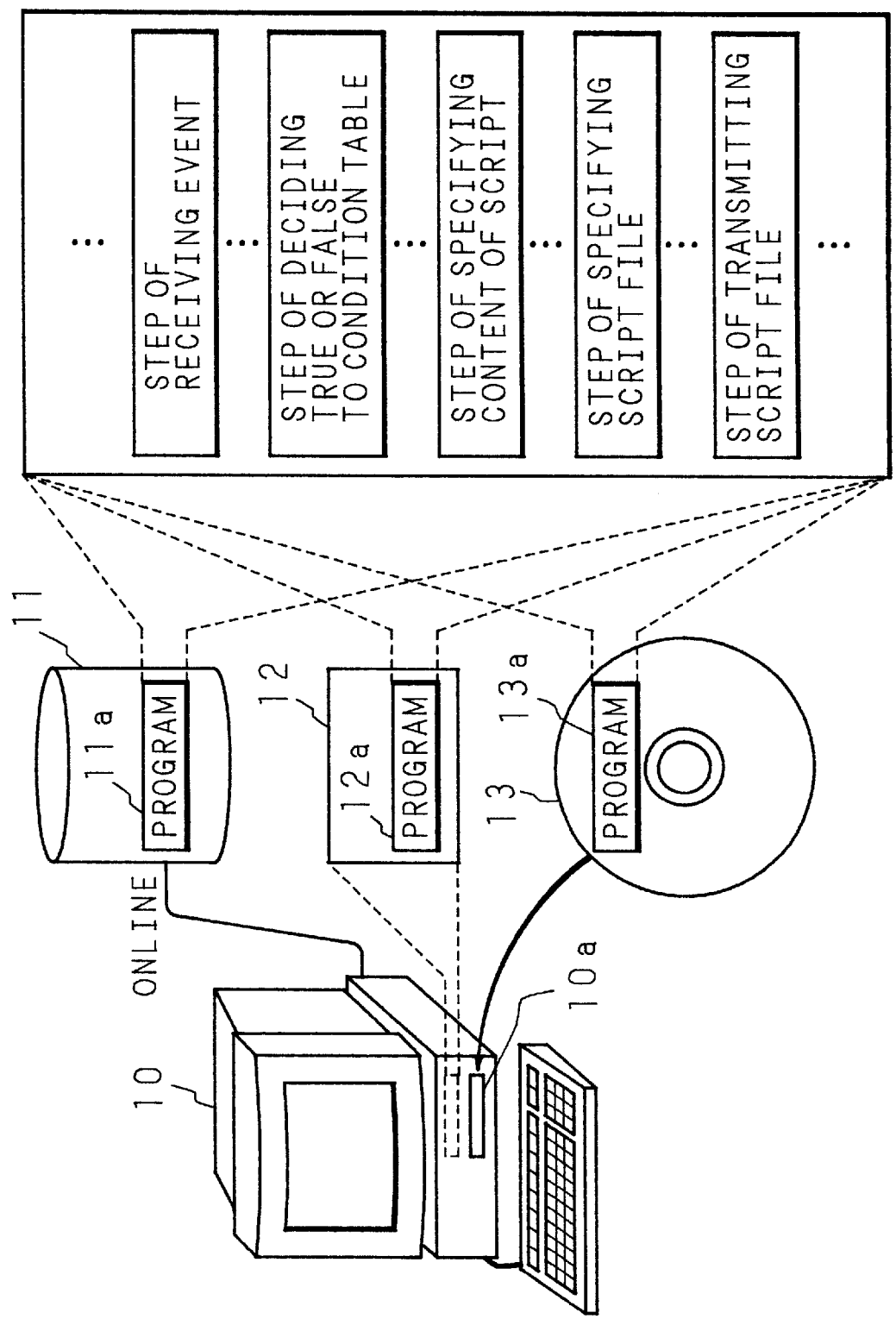
FIG. 12 is a block diagram showing an arrangement of a computer memory product according to embodiment of the present invention.

FIG. 12 is a block diagram showing an arrangement of a computer memory product according to embodiment of the present invention. A program exemplified here has a step of receiving an event, a step of deciding as to whether or not a type and content of the received event coincide with ones registered in the condition table, a step of when the decision is made that they coincide with each other, retrieving a name of the corresponding script from the script table so as to specify a content of the script corresponding to its name, a step of when receiving specification of service, specifying script files corresponding to the service, and a step of transmitting the specified script files. These steps are stored in a computer memory product, mentioned later.

In FIG. 12, a computer memory product 11, which is online-connected with the computer 10 is composed of a server computer of WWW (World Wide Web), for example, installed separately from the installation position of the computer 10, a program 11a like the aforementioned one is stored in the computer memory product 11. The program 11a read out from the computer memory product 11 controls the computer 10 so that the computer 10 functions as the service executing apparatus according to the present invention.

A computer memory product 12 provided in the computer 10 is composed of a hard disk drive or ROM (Read Only Memory), for example, installed therein, and a program 12a like the aforementioned one is stored in the computer memory product 12. The program 12a read out from the computer memory product 12 controls the computer 10 so that the computer 10 functions as the service executing apparatus according to the present invention.

A computer memory product 13 charged in a disk drive 10a provided to the computer 10 is composed of a portable magneto-optical disk, a CD-ROM or a flexible disk, for example, and a program 13a like the aforementioned one is stored in the computer memory product 13. The program 13a read out from the computer memory product 13 controls the computer 10 so that the computer 10 functions as the service executive apparatus according to the present invention.

Figure 13:
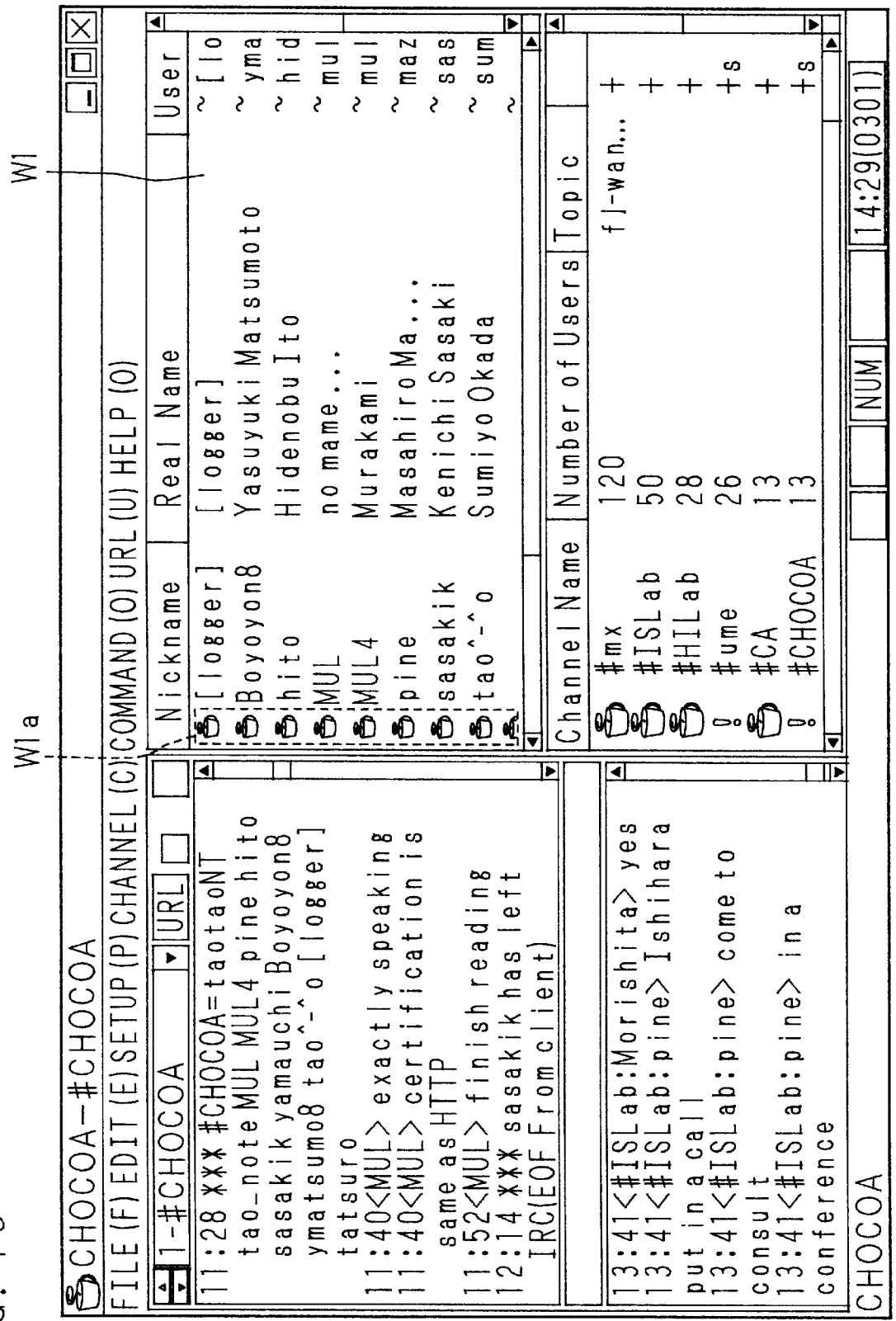
FIG. 13 is an explanatory drawing for explaining one example of a display screen in a client of a chat system according to the present invention.

FIG. 13 is an explanatory drawing for explaining one example of a display screen in the client of the chat system according to the present invention. A right upper area in FIG. 13 is a window W1 on which a list of users who can receive statements of users operating clients is displayed. The window W1 is provided with an icon area W1a on which icons representing whereabouts set by respective users are displayed, a nickname area on which nicknames of users are displayed, a real name area on which names of users are displayed, etc. from left.

In the case where a user operating a client inquires whereabouts of an arbitrary user in the statement of chat, the user can obtain information about the whereabouts of the user by means of the aforementioned notice of whereabouts service. When a plurality of icons which correspond to whereabouts information are previously prepared, and icons to be displayed on the icon area W1a according to the obtained whereabouts information is set by the client, the user operating the client can discriminate once inquired whereabouts easily.

As mentioned above, in the apparatus used for working the service executive method according to the present invention, the service executive apparatus according to the present invention and, computer controlled by the program stored in the computer memory product according to the present invention and the client of the chat system according to the present invention, only by specifying name of service at the time of use of the script file (more specifically, at the time of transmission, addition or deletion of the script file), all the script files storing the scripts combined in the service are specified so as to be used (more specifically, transmitted, added or deleted), so a burden of operations to a user who uses the service in the apparatus, computer or client can be reduced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A service executive method for executing use of service composed by combining a plurality of scripts representing a processing sequence with each other, comprising:

receiving a specification of a service to be used;

retrieving the specified service from a service table, which registers types and contents of events and scripts to be executed in a condition table, registers the scripts, services to which the scripts belong, and a script definition mainframe where contents of the scripts are described into a script table, and registers the services and corresponding script files to specify a script file, wherein the script files store the scripts combined in the services; and executing a use of the specified script file.

2. The service executive method according to claim 1, wherein the use of the script file is one of transmission of the script file, addition of the script file, and deletion of the script file.

3. A service executive apparatus for executing use of service composed by combining a plurality of scripts representing a processing sequence with each other, comprising:

a service table registering types and contents of events and scripts to be executed in a condition table, registering the scripts, services to which the scripts belong, and a script definition mainframe where contents of the scripts are described into a script table, and registering the services and corresponding script files, wherein the script files store the scripts combined in the services;

means for receiving a specification of a service to be used; and means for retrieving the specified service from the service table when receiving the specification of the service, and specifying a script file to execute a use of the specified script file.

4. The service executive apparatus according to claim 3, wherein the use of the script file is one of transmission of the script file, addition of the script file, and deletion of the script file.

5. A computer readable storage controlling a computer to execute a use of service comprising a combination of a plurality of scripts representing a processing sequence and comprising a process of registering types and contents of events and scripts to be executed in a condition table;

registering the scripts, services to which the scripts belong, and a script definition mainframe where contents of the scripts are described into a script table;

receiving a specification of a service to be used; and using a script file corresponding to the specified service.

6. The computer memory product according to claim 5, wherein the use of the script file is one of transmission of the script file, addition of the script file, and deletion of the script file.

7. A client of a chat system, said chat system having a server and a plurality of clients in which the server transmits a statement received from a client to another client and controlling a process according to a script representing a processing sequence or a service comprising a combination of a plurality of scripts, said client comprising:

a service table registering types and contents of events and scripts to be executed in a condition table, registering the scripts, services to which the scripts belong, and a script definition mainframe where contents of the scripts are described into a script table, and registering the services and corresponding script files, wherein the script files store the scripts combined in the services;

means for receiving a specification of a service to be used; and means for retrieving the specified service from the service table when receiving the specification of the service, and specifying a script file to execute a use of the specified script file.

8. The client of the chat system according to claim 7, wherein the use of the script file is one of transmission of the script file, addition of the script file, and deletion of the script file.

9. A service executive apparatus executing use of service composed by combining scripts representing a processing sequence with each other, comprising:

a service table registering types and contents of events and the scripts to be executed in a condition table, registering the scripts, services to which the scripts belong, and a script definition mainframe where contents of the scripts are described into a script table, and registering the services and corresponding script files, wherein the script files store the scripts combined in the services;

a receiving unit receiving a specification of a service to be used; and a retrieving unit retrieving the specified service from the service table when receiving the specification of the service, and specifying a script file to execute a use of the specified script file.

10. The service executive apparatus according to claim 9, wherein the use of the script file is one of transmission of the script file, addition of the script file, and deletion of the script file.

11. A client of a chat system, said chat system having a server and a plurality of clients in which the server transmits a statement received from a client to another client and controlling a process according to a script representing a processing sequence or a service comprising a combination of scripts, said client comprising:

a service table registering types and contents of events and the scripts to be executed in a condition table, registering the scripts, services to which the scripts belong, and a script definition mainframe where contents of the scripts are described into a script table, and registering the services and corresponding script files, wherein the script files store the scripts combined in the services;

a receiving unit receiving a specification of a service to be used; and a retrieving unit retrieving the specified service from the service table when receiving the specification of the service, and specifying a script file to execute a use of the specified script file.

12. The client of the chat system according to claim 11, wherein the use of the script file is one of transmission of the script file, addition of the script file, and deletion of the script file.

* * * * *